June 1, 1965 F. WANKEL ETAL 3,186,725

PISTON RING

Filed July 10, 1962

Inventors

FELIX WANKEL
LOTHAR WIEMANN

By Toulmin & Toulmin

Attorneys

United States Patent Office 3,186,725
Patented June 1, 1965

3,186,725
PISTON RING
Felix Wankel, Lindau (Bodensee), and Lothar Wiemann, Burscheid, Cologne, Germany, assignors to Goetzewerke Friedrich Goetze Aktiengesellschaft, Burscheid, Germany, a corporation of Germany
Filed July 10, 1962, Ser. No. 208,963
8 Claims. (Cl. 277—218)

The invention relates to a piston ring with a gas-tight joint which especially as seen from the side has a stepped joint so that the ends of the joint overlap one another.

Known piston rings in which the ends of the joint are of stepped construction and therefore overlap one another prevent the passage of gas in the axial direction since the gap between the two upper and surface of the ring is closed by the overlap below. There is however the possibility of the gas which should be sealed off penetrating through the gap between the end surfaces of the upper step and passing behind the ring and escaping thence through the gap in the lower step into the interior of the crank case.

Piston rings which avoid the above-mentioned disadvantages are already known. Such sealing devices consist of two sealing rings which bear against the cylinder wall, one of them being of L-shape in cross section and carrying in a recess facing the cylinder wall a ring of rectangular cross section which it presses against the cylinder wall. In this way the passage of the gas to be sealed off is prevented, in axial direction as well as in radial direction. However, such a composite ring requires a deep groove to provide satisfactory support for the rectangular ring. Also, the rectangular ring must be of sufficient radial width to have a surface applied to the side of the groove which is sufficient even after the greatest possible wear, since otherwise it could penetrate between the piston and the cylinder wall and cause the piston to stick. This means that the weight of the ring must be undesirably high and that the L-shaped ring must be distorted, so that the gases to be sealed off can nevertheless penetrate between the two rings and ultimately escape through the joint of the rectangular ring.

According to the invention it is proposed to cover the lower gap, facing away from the pressure medium, of the lap joint of piston rings by means of a sealing member provided on the back of the ring and following the radial movements of the ring. Preferably the sealing member is axially smaller than the piston ring in the region of the gap so that the gas to be sealed off can penetrate behind the ring and apply additional pressure of the sealing member.

A further solution of this problem is to construct the low pressure sides of the lap joint in a special way and to close them with a suitable insert. For example, a lap joint may be formed by stepped formation of the ends of the joint of a piston ring or by means of two piston rings in one groove, superimposed and displaced relative to one another and secured against relative rotation. The boundary surfaces of the low pressure gap extending parallel to the piston axis are so designed that they form a relatively wide wedge shaped space which narrows in the direction from the back of the ring towards the cylinder wall. In this space is inserted an insert which is preferably similarly shaped and has a cut-away apex. With such an arrangement the gap of the lap joint on the high pressure side is sealed by the low pressure ring or part thereof which at that point is fully applied to the cylinder wall. Penetration of high pressure from the back of the ring through the gap on the low pressure side to the cylinder wall and to the low pressure side is prevented by the insert which is applied by the high pressure. At the cylinder wall the low pressure side gap is covered by the high pressure side ring or part thereof which at that point is fully applied.

A useful development of the invention is to make the lateral boundary surfaces of this insert and/or the corresponding co-acting surfaces of circular cylindrical form. The apex of the insert is preferably cut away so that it does not contact the cylinder wall even with the greatest possible play in the joint. Further, it is advantageous to provide the back of the insert with some raised parts in order to avoid sticking to the base of the groove. In general, the pressure of the gas to be sealed off suffices to apply the insert; however, additional pressure springs of any desired form may also be used.

It is also advantageous to seal the ring arranged on the low pressure side by a circular diaphragm which is sprung into a groove in the back of the ring and in the base of the groove. For the sake of simplicity the ring on the low pressure side may consist of three circular discs the central one of which has a larger internal diameter so that for example after the individual rings have been soldered a groove is provided for the diaphragm.

If the pressure to be sealed off can arise alternately at both sides of the ring, it is possible and advisable to make both gaps in the joint of the lap joint in accordance with the invention and correspondingly to use two inserts.

For the purpose of easy assembly the individual parts of the ring arrangement may be connected together by a lacquer which dissolves away during running.

Advantageously the sealing member is made annular and inserted for example in a recess in the back of the ring so as to be secured against axial displacement. It is possible to assemble the rings with relatively displaced joints and to fix them in this position. Experience has shown however that it is sufficient to break away the adjacent edges of both rings so that the two joints cannot catch in one another.

An embodiment of the invention is shown by way of example in the accompanying drawings, in which FIG. 1 is a view of part of a piston ring from the low pressure side;

Figure 1:
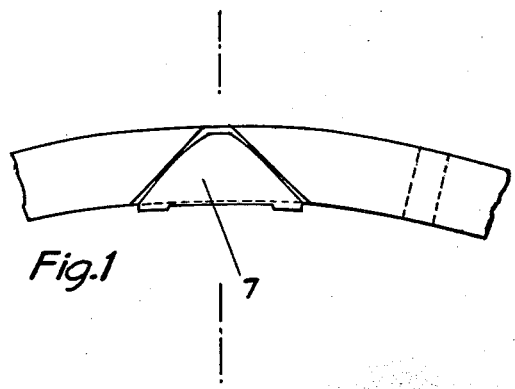
Figure 2:
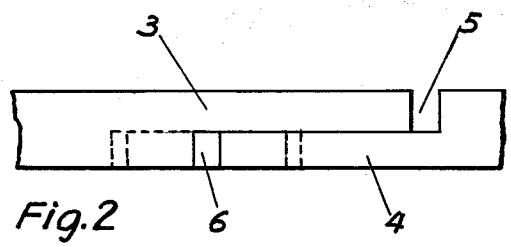
FIG. 2 shows the joint as seen from the cylinder wall.
Figure 3:
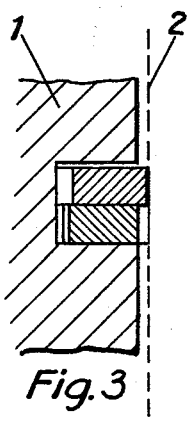
FIG. 3 is a cross-section of the joint of the ring shown in FIG. 1.

In FIGS. 1 to 3 the piston ring which has a step 3 on the high pressure side and a step 4 on the low pressure side is arranged within a groove in the piston 1 and bears tightly against the cylinder wall indicated at 2. The high pressure gap 5 is covered by the step 4 whilst the gap 6 is closed by an insert 7 which conforms substantially to the space to be filled in. The gap 6 is formed so that the lateral boundary surfaces thereof which are parallel to the piston axis form a space which narrows towards the cylinder wall. The flattened rear part of the insert 7 may bear on the base of the groove.

We claim:

1. A piston ring for internal combustion engines and the like, comprising an annular ring structure having a joint therein to permit radial compression and expansion thereof, said joint being divided into an upper and a lower gap each having spaced confining end walls, said gaps being circumferentially offset relative to each other and connected by a circumferentially extending line of separation parallel to the plane of the ring and dividing the portion of the ring structure between said gaps to form a lap joint which isolates said gaps from each other within the confines of the ring, and a sealing member disposed at the inner side of the ring structure adjacent the lower gap only and free of connection to the ring or to a piston on which the ring is mounted, operative to engage and seal against the confining end walls of said lower gap thereby to cover and seal the latter, said sealing member being so constructed and arranged as to follow the radial movement of the ring structure while remaining in sealing engagement with the confining end walls of said lower gap and while preventing flow of gas axially or radially through said lower gap.

2. A piston ring according to claim 1, characterised in that the sealing member is the same axial length as said lower gap.

3. A piston ring according to claim 2, in which said sealing member is solid.

4. A piston ring according to claim 3 in which said sealing member has the wall thereof toward the center of the piston ring substantially concentric with respect to the center of the piston ring and protrusions extending from the said wall toward the center of the piston ring to permit gas in a piston groove in which the piston ring and sealing member are mounted to have access to the said wall to urge the sealing member toward the cylinder wall.

5. A piston ring according to claim 4 in which the walls of said sealing member which engage the said confining end walls of said lower gap are convex toward the said confining end walls so as to maintain substantially line contact between the said confining end walls and the adjacent walls of the sealing member at all times.

6. A piston ring according to claim 5, in which said gaps are substantially equal in axial length with each thereof extending through substantially one-half of the axial length of the piston ring.

7. A piston ring according to claim 1, characterised in that said lower gap of the joint is provided with confining end walls which extend parallel to the piston axis and approach one another towards the cylinder wall and that in the wedge-shaped space thereby formed there is inserted the sealing member which is of substantially the same shape.

8. A piston ring according to claim 7, characterised in that each said confining end wall of said lower gap forms an angle of at least 30° with respect to a radius of the piston ring and passing through the center of the gap.

References Cited by the Examiner

UNITED STATES PATENTS

| 1,696,424 | 12/28 | Thompson | 277—151 |
| 2,085,457 | 6/37 | Westerhouse | 277—185 |
| 2,118,433 | 5/38 | Goodyear | 277—193 |
| 2,240,624 | 5/41 | Marien | 277—193 |
| 2,359,007 | 9/44 | Smith | 277—193 |
| 2,439,546 | 4/48 | McFall | 277—160 |
| 2,537,721 | 1/51 | Walker | 277—218 |
| 2,629,641 | 2/53 | Smith | 277—160 |

FOREIGN PATENTS

| 145,972 | 4/52 | Australia. |
| 1,193 | 5/55 | Great Britain. |
| 262,716 | 4/26 | Great Britain. |
| 520,192 | 4/40 | Great Britain. |

EDWARD V. BENHAM, *Primary Examiner.*